(12) United States Patent
Murakami

(10) Patent No.: US 8,105,171 B2
(45) Date of Patent: Jan. 31, 2012

(54) TORQUE LIMITING MECHANISM

(75) Inventor: Hiroaki Murakami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 379 days.

(21) Appl. No.: 12/373,422

(22) PCT Filed: Aug. 11, 2006

(86) PCT No.: PCT/JP2006/315966
§ 371 (c)(1),
(2), (4) Date: Jan. 12, 2009

(87) PCT Pub. No.: WO2008/018149
PCT Pub. Date: Feb. 14, 2008

(65) Prior Publication Data
US 2009/0301836 A1  Dec. 10, 2009

(51) Int. Cl.
*F16D 7/02* (2006.01)
(52) U.S. Cl. .......................................... 464/46; 464/30
(58) Field of Classification Search .................... 464/30, 464/35, 36, 42–48
See application file for complete search history.

(56) References Cited

U.S. PATENT DOCUMENTS

| 3,511,349 A * | 5/1970 | Herscovici ................. 464/36 X |
| 4,624,650 A * | 11/1986 | Hiruma et al. ............. 464/46 X |
| 5,031,746 A * | 7/1991 | Koivunen |
| 7,128,193 B2 * | 10/2006 | Murakami |
| 7,377,871 B2 * | 5/2008 | Bowen ........................ 464/43 X |
| 2003/0029688 A1 * | 2/2003 | Lovatt ......................... 464/46 X |

FOREIGN PATENT DOCUMENTS

| JP | 2002-031156 A | 1/2002 |
| JP | 2005-133775 A | 5/2005 |
| JP | 2005-327332 A | 11/2005 |
| JP | 2006-177382 A | 7/2006 |

* cited by examiner

*Primary Examiner* — Gregory Binda
(74) *Attorney, Agent, or Firm* — Sughrue Mion, PLLC

(57) ABSTRACT

A high-precision torque limiting mechanism capable of limiting an output torque to a magnitude of not more than a prescribed value, as well as to reduce a frictional torque produced upon occurrence of a slip. To accomplish this object, a ball ramp section (13) is attached to a slip clutch section (3) for reducing friction between friction plates (31) and (32) forming the slip clutch section (3) and limiting a torque to be transmitted by utilizing an axial thrust produced at the ball ramp section (13) in accordance with the magnitude of an input torque. The precision with which the torque to be transmitted is limited is enhanced by making improvements to the shape of an internal side surface of a recess (G) formed in each of cam elements (131) and (132) of the ball ramp section (13).

1 Claim, 5 Drawing Sheets

TORQUE LIMITING MECHANISM

TECHNICAL FIELD

The present invention relates to power transmission systems of aircrafts, general industrial machines and the like and, more particularly, to a torque limiting mechanism for limiting transmission of an excessive input torque when such an excessive input torque works.

BACKGROUND ART

A slip clutch is well-known as a mechanism capable of transmitting a torque from an input shaft to an output shaft while limiting transmission of an excessive input torque when such an excessive input torque works (see patent documents noted below for example). The slip clutch is configured to transmit a torque through friction between a friction plate spline-coupled to the input shaft and a friction plate spline-coupled to the output shaft and limit transmission of the torque by causing the friction plates to slip relative to each other when an excessive input torque works.

Presently, however, a problem exists that it is difficult to reliably limit an output torque to a desired magnitude of not more than a prescribed value because of instability in friction coefficient and depending on some operating conditions even when braking materials having preferable properties are combined with each other. Particularly, the slip clutch undeniably allows a surge or overshoot phenomenon such that the output torque exceeds the prescribed value undesirably to occur before and after occurrence of a slip.

In addition, there exists a request to make a frictional torque produced by the friction plates upon occurrence of the slip as small as possible. This is because generation of heat and the amount of wear increase as the frictional torque produced upon occurrence of the slip increases.

An intended object of the present invention having been made in view of the foregoing circumstances is to realize a high-precision torque limiting mechanism capable of limiting the output torque to a magnitude of not more than the prescribed value, as well as to reduce the frictional torque produced upon occurrence of the slip.

Patent Document 1: Japanese Patent Application No. 02005-327332
Patent Document 2: Japanese Patent Laid-Open Publication No. 2002-031156

DISCLOSURE OF THE INVENTION

According to the present invention, a ball ramp section is attached to a torque limiting mechanism having a slip clutch section intervening between an input shaft and an output shaft for reducing friction between friction plates forming the slip clutch section by transmitting an input torque at least partially to one cam element of the ball ramp section and utilizing an axial thrust produced at the ball ramp section in accordance with a magnitude of the torque thus transmitted. In general, friction plates forming a slip clutch are elastically biased so as to be pressed against each other. When an excessive torque having a magnitude exceeding a prescribed value works, the torque limiting mechanism reduces the frictional torque produced by the friction plates by causing the ball ramp section to produce an axial thrust of a required magnitude and balancing the axial thrust against the elastically biasing force.

Further, the torque limiting mechanism has an arrangement wherein the cam elements of the ball ramp section are formed with respective recesses each having an internal side surface shaped such that: the internal side surface has first and second contact positions; a ball shifts from the first contact position to the second contact position as the two cam elements rotate relative to each other; and an acute angle formed between a contact surface contacting the ball at the second contact position and a plane perpendicular to an axis is smaller than an acute angle formed between a contact surface contacting the ball at the first contact position and the plane perpendicular to the axis. When a torque transmitted to the friction plates exceeds a frictional torque produced by the friction plates, a slip occurs in the slip clutch section. An increase in the torque transmitted to the friction plates and a decrease in the frictional torque produced by the friction plates are both caused by an increase in an input torque inputted to the input shaft. For this reason, even when the ball ramp section is caused to start operating at the time an input torque of the prescribed value works, namely, even when the ball ramp section produces an axial thrust to cause the two cam elements to move away from each other at that time, it is possible that the decrease in frictional torque fails to catch up a further increase in input torque, resulting in occurrence of a slip at a higher frictional torque than estimated. Stated otherwise, an output torque having a magnitude exceeding the prescribed value may be transmitted to the output shaft undesirably. The present invention focuses attention on the fact that the relationship between the increase in input torque and the increase in axial thrust is determined by the shape of the internal side surface of the recess of each cam element, particularly, the angle of inclination of a contact surface at which the internal side surface of the recess contacts the ball. Thus, by shaping the internal side surface of each recess as described above, a more increase in axial thrust can be obtained from a less increase in input torque after the ball ramp section has started operating.

According to the present invention, it is possible to realize a high-precision torque limiting mechanism capable of limiting the output torque to a magnitude of not more than the prescribed value, as well as to reduce the frictional torque produced upon occurrence of the slip.

BRIEF OF DRAWINGS

BEST MODE FOR CARRYING OUT THE INVENTION

Figure 1:
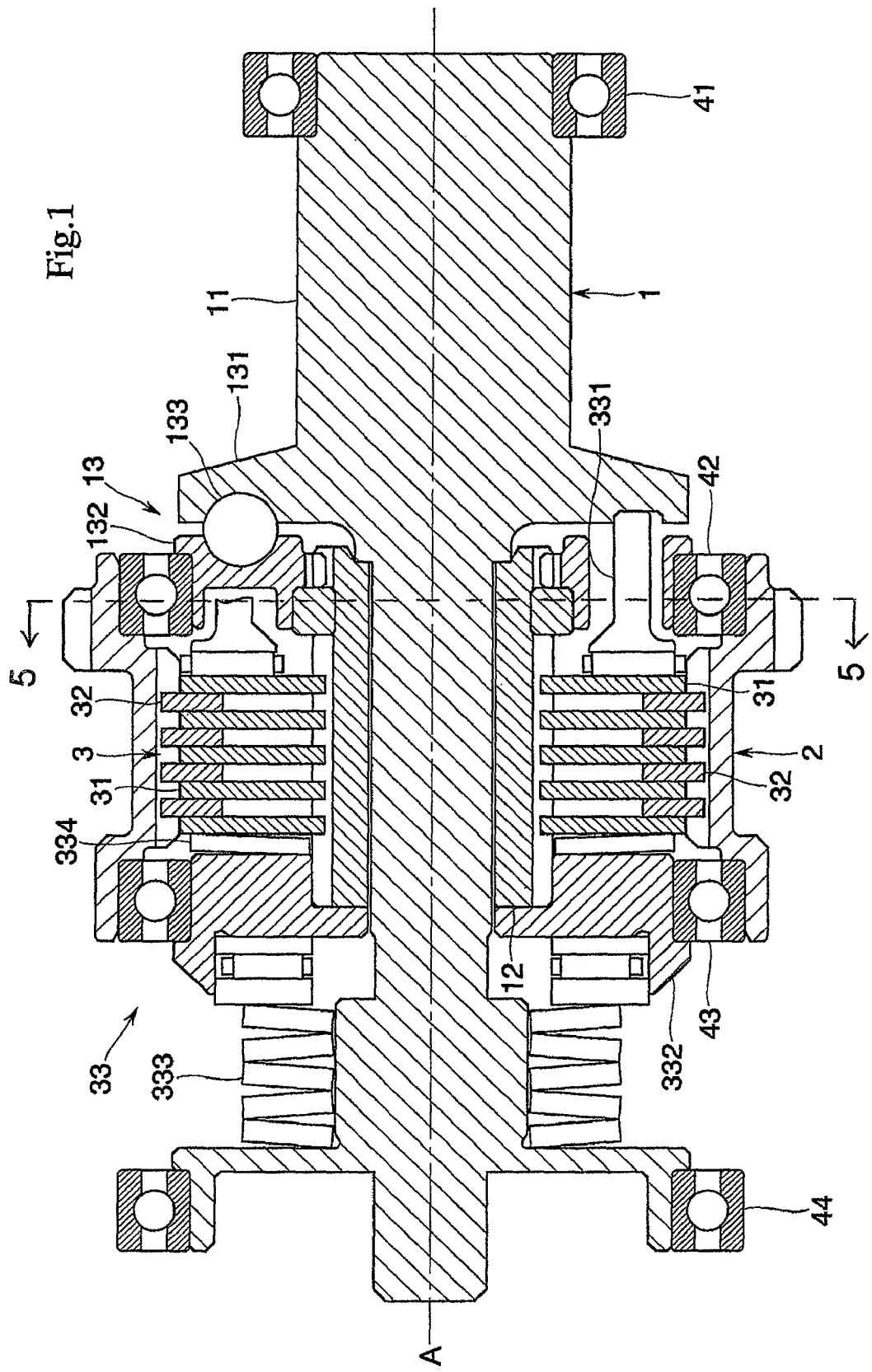
FIG. 1 is an end view showing a torque limiting mechanism according to one embodiment of the present invention.

Hereinafter, one embodiment of the present invention will be described with reference to the drawings. As shown in FIG. 1, a torque limiting mechanism according to the present embodiment includes an input shaft (or output shaft) 1 and an output shaft (or input shaft) 2 which are driven to rotate about the same axis A, and a slip clutch section 3 intervening between the input shaft 1 and the output shaft 2 to interconnect the two shafts for transmitting a torque inputted to the input shaft 1 to the output shaft 2.

The input shaft 1 includes an input shaft body 11, an input-side rotor member 12 driven by the input shaft body 11, and a ball ramp section 13 intervening between the input shaft body 11 and the rotor member 12. The rotor member 12 is displaceable along the axis A independently to the input shaft body 11 and rotatable about the axis A. The ball ramp section 13 includes cam elements 131 and 132 forming a pair along the axis A, and a ball 133 held between recesses (grooves) G each formed in respective one of the two cam elements 131 and 132 and functions to transmit the input torque to the rotor member 12 as well as to drive a float block 332 to be described later by producing an axial thrust when the input torque having a magnitude exceeding a prescribed value works. In the present embodiment, one cam element 131 is securely fixed to a predetermined portion of the input shaft body 11 in such a manner as to expand radially, while the other cam element 132 is spline-coupled (key-coupled) to the outer periphery of the rotor member 12 so as to face the cam element 131. In principle, the cam element 132 fails to be displaced relative to the rotor member 12.

The slip clutch section 3 includes friction plates 31 positioned closer to the input shaft 1, friction plates 32 positioned closer to the output shaft 2, and elastically biasing means 33 for pressing the friction plates 31 and 32 along the axis A. In the present embodiment, the input-side rotor member 12 is accommodated in the output shaft 2, and the friction plates 31 and the friction plates 32 are spline-coupled to the outer periphery of the rotor member 12 and the inner periphery of the output shaft 2, respectively, and are interleaved with each other along the axis A. The elastically biasing means 33 comprises, as elements thereof, a push block 331 holding the friction plates 31 and 32 from one side, the float block 332 pressing the friction plates 31 and 32 from the other side, a preload spring 333 elastically biasing the float block 332 toward the push block 331, and a brake spring 334 intervening between the float block 332 (or push block 331) and the friction plates 31 and 32 to elastically bias the friction plates 31 and 32 toward the push block 331 (or float block 332). The preload spring 333 serves also as means for elastically biasing the rotor member 12 and the cam element 132 toward the cam member 131 via the float block 332.

In FIG. 1, reference numerals 41, 42, 43 and 44 designate bearings.

When a torque is inputted to the input shaft 1, the torque is transmitted to the output shaft 2 through friction between the friction plates 31 and 32, so that the input shaft 1 and the output shaft 2 rotate synchronously. When an excessive input torque having a magnitude exceeding the prescribed value works, the torque to be transmitted is limited by causing the friction plates 31 and 32 to slip relative to each other. At that time, the ball ramp section 13 is operated to produce an axial thrust which displaces the input-side rotor member 12 and the float block 332 away from the push block 331 along the axis A. By so doing, the biasing force pressing the friction plates 31 and 32 is weakened to reduce the frictional torque produced by the friction plates 31 and 32. It is needless to say that the input shaft 1 and the output shaft 2 rotate asynchronously with each other when the slip occurs.

Figure 2:
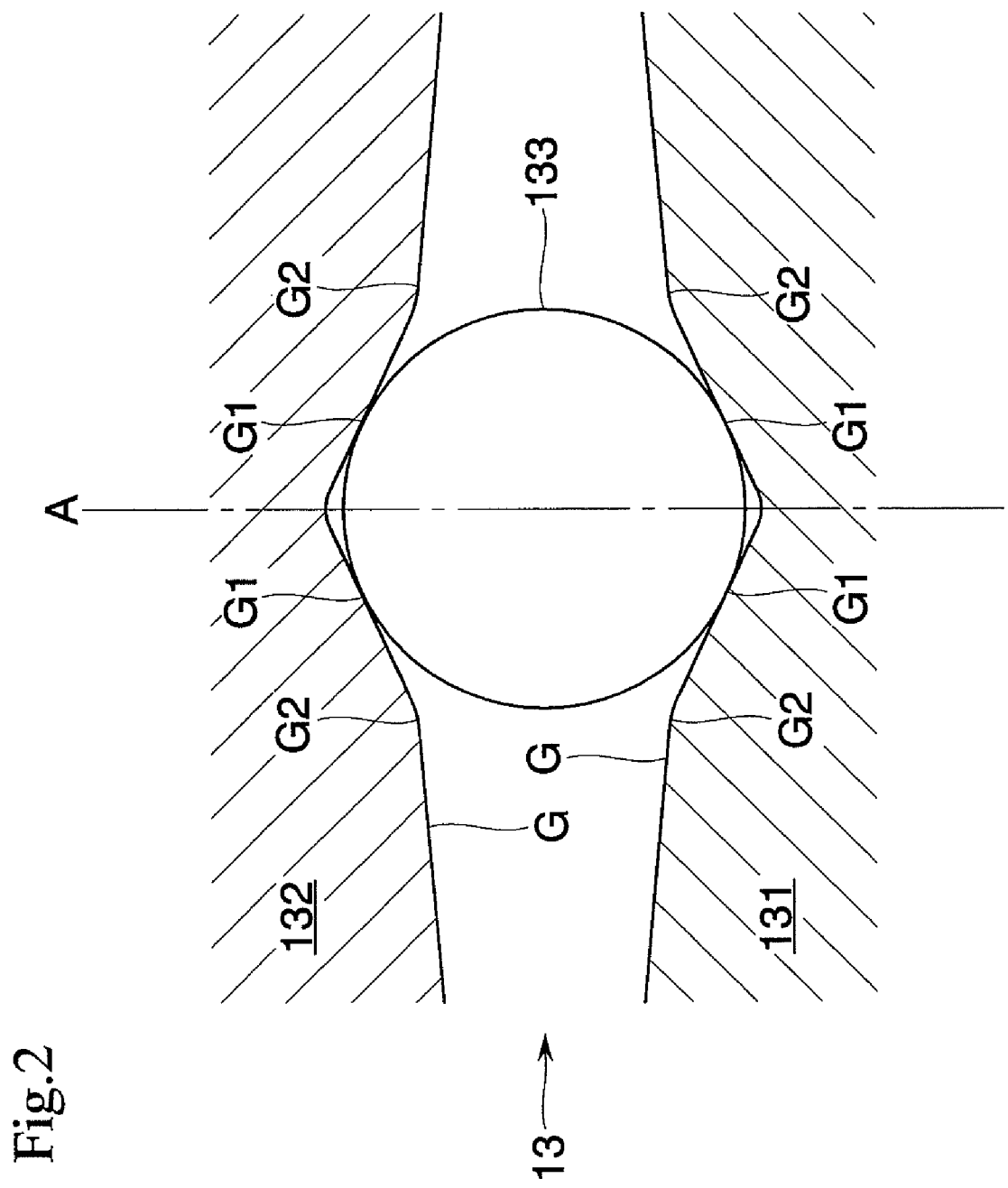
FIG. 2 is a sectional view showing a portion of concern of a ball ramp section of the torque limiting mechanism.
Figure 3:
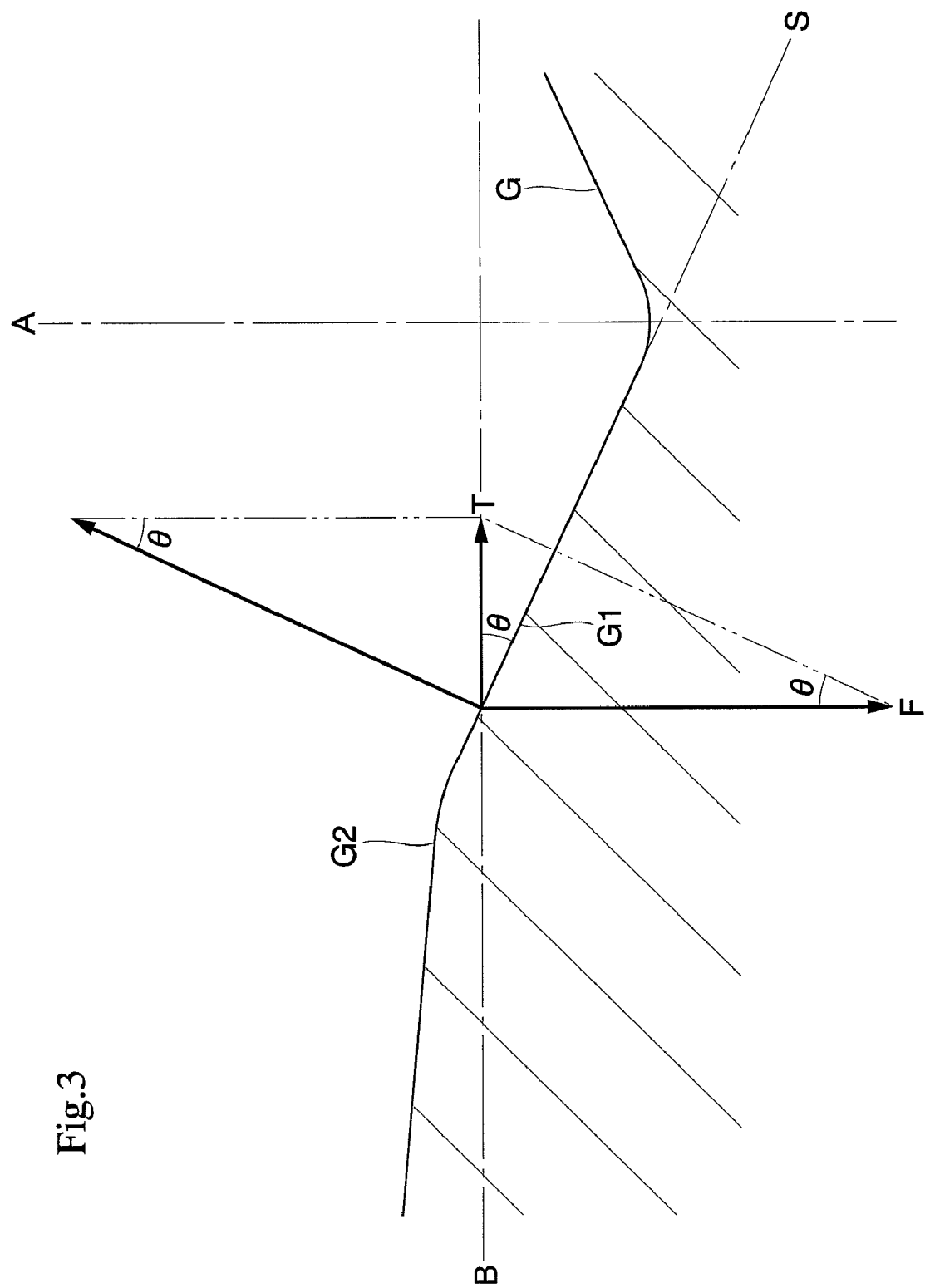
FIG. 3 is a fragmentary enlarged view of the portion shown in FIG. 2.

Further, the present torque limiting device enhances the precision with which the torque to be transmitted is limited by making improvements to the shape of an internal side surface of the recess G formed in each of the two cam elements 131 and 132 of the ball ramp section 13. The shape of the internal side surface of the recess G is shown in FIGS. 2 and 3. The internal side surface of the recess G of each of the cam elements 131 and 132 is a continuous surface having plural contact positions G1 and G2 for contacting the ball 133.

During a phase in which the input torque has a magnitude of not more than the prescribed value and the operation of the ball ramp section 13 is not started yet, no phase difference occurs between the cam elements 132 and 131 in the direction of rotation and, hence, the cam element 132 is in a position closest to the cam element 131. In this condition, the ball 133 contacts each of the cam elements 131 and 132 at a point adjacent the first contact position G1. When the ball ramp section 13 is caused to start operating due to the magnitude of the input torque exceeding the prescribed value, a phase difference occurs between the cam elements 132 and 131 in the direction of rotation, so that the cam element 132 is displaced in a direction away from the cam element 131. At that time, the contact position of the ball 133 is gradually shifted from the point adjacent the first contact position G1 toward the second contact position G2 and then toward a point beyond the second contact position G2 in accordance with the magnitude of the input torque transmitted to the cam element 131.

As apparent from FIG. 3, the relationship between a torque T and an axial thrust F at a position of contact between the internal side surface of the recess G and the ball 133 is $\tan\theta \approx F/T$, where $\theta$ represents an angle of inclination (acute angle) formed between a contact surface S of the internal side surface of the recess G which contacts the ball 133 and an imaginary plane B perpendicular to the axis A. Since the cam element 132 is elastically biased by the preload spring 333, the amounts of displacement of the cam element 132 and input-side rotor member 12 along the axis A as well as the amount of displacement of the float block 332 along the axis A are substantially proportional to the axial thrust F. On condition that the torque T is constant, the amount of displacement of the float block 332 along the axis A is substantially proportional to the angle $\theta$ of inclination of the contact surface S.

In the present torque limiting device, the internal side surface of each recess G is shaped so that the angle of inclination of the contact surface at the second contact position G2 is smaller than the angle of inclination of the contact surface at the first contact position G1. In addition, a surface portion extending from the first contact position G1 to the second contact position G2 is shaped into a curved surface of which the angle of inclination decreases gradually. A surface portion extending beyond the second contact position G2 is shaped into an inclined surface having an angle of inclination substantially equal to the angle of inclination at the second contact position G2 for example.

Figure 4:
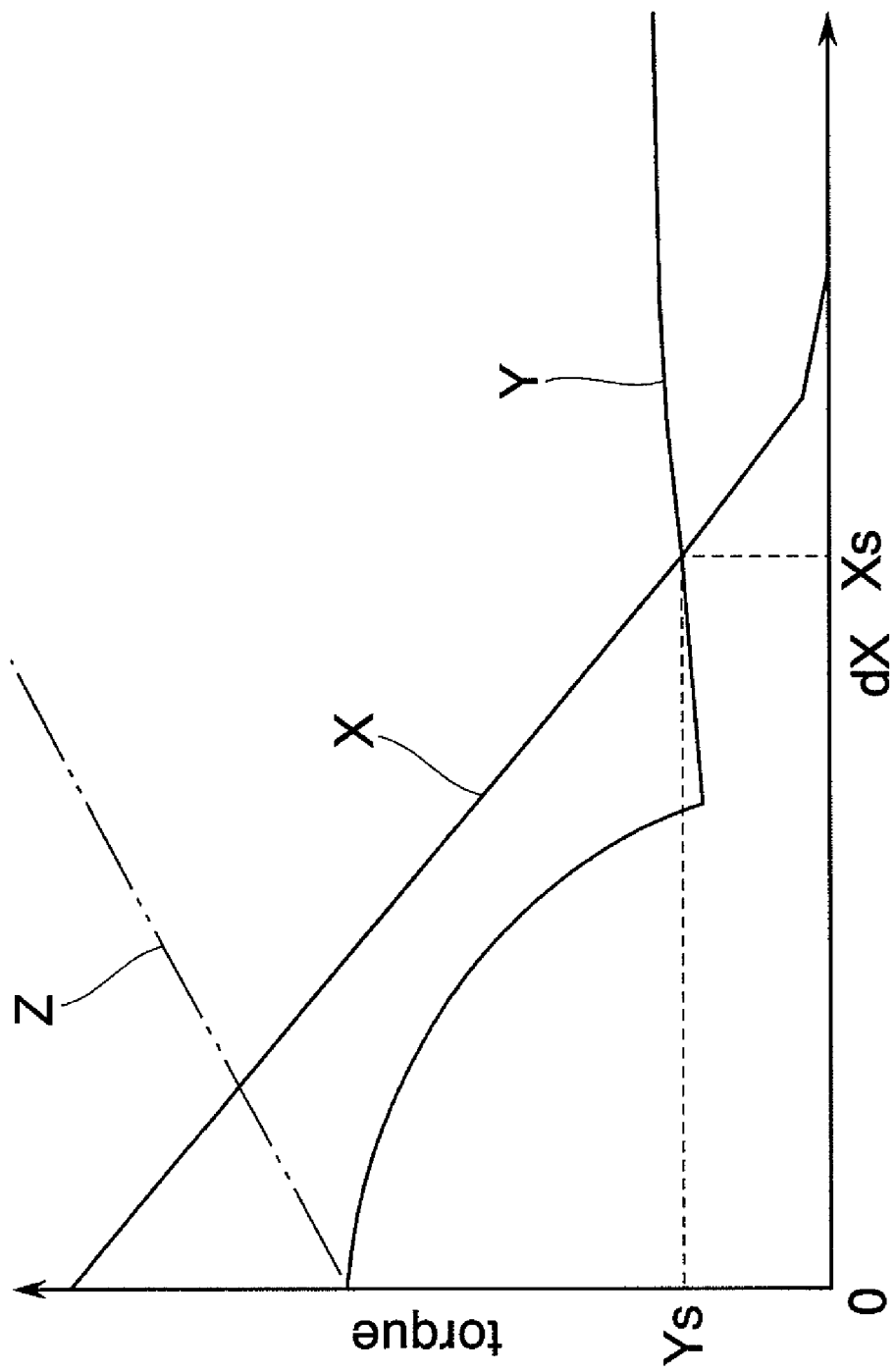
FIG. 4 is a graph plotting the relationship between the frictional torque and the amount of displacement of a float block and the relationship between the input torque and the amount of displacement of the float block.
Figure 5:
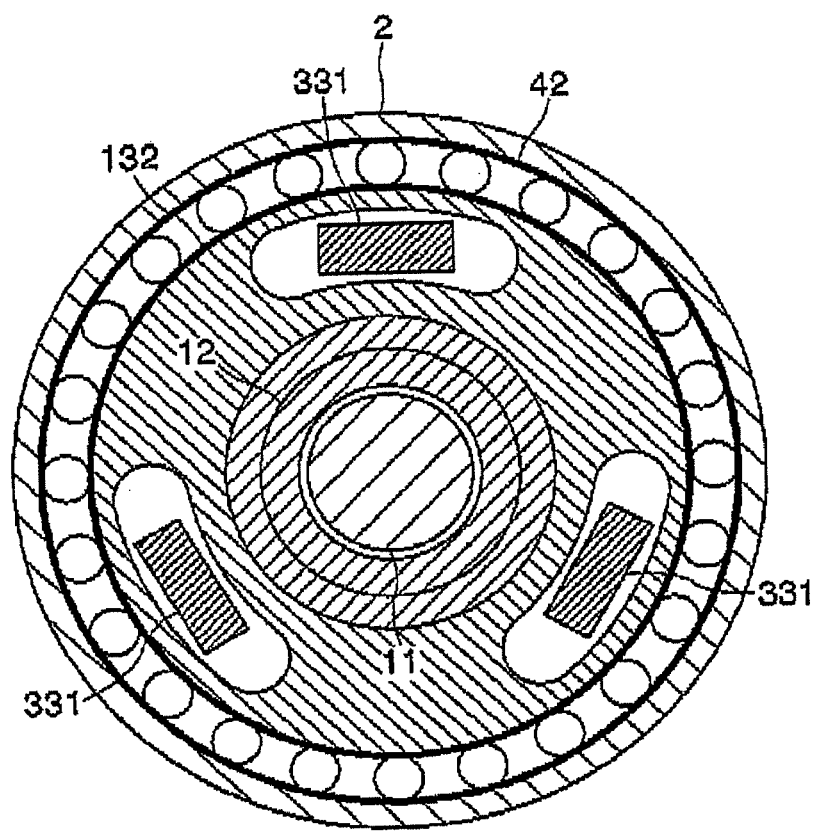
FIG. 5 is a cross-sectional view taken along the line 5-5 in FIG. 1.

FIG. 4 plots relationship X between the amount of displacement of the float block 332 along the axis A and the frictional torque produced by the friction plates 31 and 32 and relationship Y between the amount of displacement of the float block 332 and the input torque causing the displacement to occur. The frictional torque produced by the friction plates 31 and 32 is substantially inversely proportional to the amount of displacement of the float block 332. On the other hand, the input torque causing the float block 332 to be displaced decreases gradually from the moment at which the ball ramp section 13 starts operating (i.e., the amount of displacement=+0) while increasing the amount of displacement. Such a gradual decrease continues until the ball 133 having left the first contact position G1 reaches the second contact position G2. After the ball 133 has reached the second contact position G2, the input torque and the amount of displacement are rendered substantially proportional to each other by the constant angle of inclination of the internal side surface.

A slip of the friction plates 31 and 32 relative to each other occurs at the time the input torque exceeds the frictional torque, namely, at the point of intersection of the plots X and Y in FIG. 4. Upon occurrence of the slip, the magnitude of the input torque is Ys and the magnitude of the frictional torque is Xs. In this way, the present torque limiting device makes it possible to reliably limit the torque to be transmitted from the input shaft 1 to the output shaft 2 to a magnitude of not more than the prescribed value, as well as to reduce the frictional torque produced by the friction plates 31 and 32 upon occurrence of the slip.

Conventionally known ball ramps, in general, are of the type provided with recesses each having an internal side surface formed of an inclined surface at a constant angle of inclination. If an attempt is made to increase the axial thrust by such a ball ramp in order to cause the friction plates to slip relative to each other, the input torque has to be increased gradually as shown by plot Z in FIG. 4. Therefore, a possibility that an excessive torque having a magnitude exceeding the prescribed value is transmitted undesirably, cannot be denied. Further, the frictional torque produced upon occurrence of a slip increases inevitably.

The present invention is not limited to the foregoing embodiment specifically described above. In particular, the shape of the internal side surface of the recess G of each of the cam elements 131 and 132 is not limited to the example shown.

Specific structures of other portions are not limited to the foregoing embodiment, but may be varied variously without departing from the concept of the present invention.

The invention claimed is:

1. A torque limiting mechanism having a slip clutch section intervening between an input shaft and an output shaft for limiting an output torque by causing a slip to occur in the slip clutch section when an input torque having a magnitude exceeding a prescribed value works, characterized in that:

a ball ramp section including a pair of cam elements formed with respective recesses and a ball held between the recesses of the pair of cam elements is provided for reducing friction between friction plates forming the slip clutch section by transmitting the input torque at least partially to one of the cam elements and utilizing an axial thrust produced by rotation of that cam element relative to the other cam element in accordance with a magnitude of the torque thus transmitted; and the recesses of the cam elements each have an internal side surface shaped such that: the internal side surface has first and second contact positions; the ball shifts from the first contact position to the second contact position as the two cam elements rotate relative to each other; and an acute angle formed between a contact surface contacting the ball at the second contact position and a plane perpendicular to an axis is smaller than an acute angle formed between a contact surface contacting the ball at the first contact position and the plane perpendicular to the axis.

* * * * *